United States Patent [19]

Nelson et al.

[11] 4,012,015

[45] Mar. 15, 1977

[54] CONTROL AND SYNCHRONIZATION OF TWIN ENGINES WITH A MASTER THROTTLE LEVER

[75] Inventors: Lewis A. Nelson, Los Angeles; Herbert L. Cox, Manhattan Beach, both of Calif.

[73] Assignee: Northrop Corporation, Los Angeles, Calif.

[22] Filed: Dec. 29, 1975

[21] Appl. No.: 644,860

[52] U.S. Cl. .......................... 244/83 F; 74/480 R; 74/529; 74/540

[51] Int. Cl.² ................. B64C 13/04; B64C 13/08

[58] Field of Search ................ 244/83 F; 74/480 R, 74/483, 527, 529, 532, 540, 541

[56] References Cited

UNITED STATES PATENTS

| | | | |
|---|---|---|---|
| 2,127,225 | 8/1938 | Jensen | 74/480 R |
| 2,512,312 | 6/1950 | Deardorff | 74/532 |
| 2,579,959 | 12/1951 | Petersen | 74/480 R |
| 2,613,547 | 10/1952 | Stewart | 74/480 R |
| 3,424,024 | 1/1969 | Derbfuss | 74/480 R |

*Primary Examiner*—Trygve M. Blix
*Assistant Examiner*—Galen L. Barefoot
*Attorney, Agent, or Firm*—William W. Rundle; Willard M. Graham

[57] ABSTRACT

In an aircraft having two engines, a pilot's master control throttle assembly for selectively operating one or both engines and configured to allow for synchronization of the engines using only the master control throttle, the master control assembly has a master throttle lever with a fixed carriage pin extending laterally therefrom which engages detents located in separate slave throttles for each engine. The detent in one slave throttle is a snug fit around the carriage pin, releasably locking it to the master throttle, while the detent in the other slave throttle is elongated, allowing for engine synchronization by movement of the carriage pin within the range of the elongated detent. The slave throttles are spring loaded and can be selectively disengaged from or engaged to the master throttle.

11 Claims, 7 Drawing Figures

CONTROL AND SYNCHRONIZATION OF TWIN ENGINES WITH A MASTER THROTTLE LEVER

BACKGROUND OF THE INVENTION

This invention herein described was made in the course of United States Air Force Contract F33657-72-C-0706. The U.S. Government has an irrevocable, nonexclusive and royalty-free license to practice (throughout the world for Governmental purposes) the invention described herein.

This invention relates in general to a throttle control mechanism for a twin engine aircraft or other vehicle and in particular to an improved throttle control which allows the pilot of the aircraft to synchronize the engines without having to move the position of his hand on the handle of the master throttle. The throttle mechanism also has provisions whereby the pilot can selectively disengage or engage the slave throttle for either engine from the master throttle.

Numerous, widely differing throttle mechanisms have been devised for simultaneous control of multiple engine aircraft. In the prior art, for example, Rosatelli (U.S. Pat. No. 1,889,295) devised a complex arrangement of gears, cams and friction locks to operate multiple engines by a master throttle.

Steward (U.S. Pat. No. 2,613,547) invented a throttle control for dual engines which provided a transverse shaft having eccentric pins oppositely disposed from a crank disc mounted in the master throttle. The pins normally locked slave levers for movement with the master throttle and were rotatable by a worm gear attached to a hand operated knob. Rotation of the knob in either direction moved one pin and its associated slave lever in a direction to open its throttle and simultaneously moved the other pin and its associated slave lever in a direction to slightly close its throttle. Obviously to accomplish engine synchronization by this method the pilot had to either remove his hand from the handle of the master throttle or use two hands to synchronize the engines.

Accordingly, it is an object of this invention to provide a throttle control mechanism which allows a pilot to synchronize the two engines of a twin engine aircraft without removing his hand from the control handle of the master throttle. Another object is to provide a means for synchronizing engines without the requirement for devices such as verniers, gears, knobs, buttons or other secondary devices.

Another object is to provide a slave throttle control for each engine which is selectively disengageable from a master throttle control and can be either manually or automatically engaged with the master throttle.

A further object is to provide a master and slave throttle control assembly wherein the side-by-side relative location of master and slave throttle controls can be made in any order of position.

BRIEF SUMMARY OF THE INVENTION

Briefly, our invention comprises three adjacent movable control members, such as handles or levers, two of them having conventional means for respective connections to their corresponding engine throttles, and the third, or master control member, being engageable with either or both of the first two (termed slave levers) in a certain prescribed driving manner. A releasable locking engagement is provided between the master lever member and one of the engine slave levers, that is, when engaged, the master and this one or first slave lever move together integrally in unison. A releasable "free play" engagement is provided between the master lever and the other slave lever, that is, when engaged, there is a certain amount of slack or free movement of the master lever possible where no movement of the second slave lever is caused, and vice versa. When the slack of the engagement is taken up, the second slave lever is then positively driven by the master lever, until reversal of the master lever.

Handles or knobs are provided on the slave levers so that when disengaged from the master lever by the pilot, each slave lever can be moved independently of the other. These slave handles are each preferably the manual actuator of release means disengaging the slave lever from the master lever.

The engagement means preferably comprises a spring-loaded pawl type member on one lever having a ramp surface inclined to the direction of motion of a latching pin member fixed to an adjacent lever so that automatic engagement is achieved by the pin member riding over the pawl and compressing a spring until the ramp of the pawl is passed, whereupon a pawl notch or detent snaps around the pin member to effect the engagement. In the case of the locking engagement, the detent of the pawl is just large enough to capture the pin member. In the case of the free play engagement, the detent of the pawl is simply made appreciably wider than the pin member so that the desired free play of the pin member exists while in the pawl detent.

By this means, pilot's operation of both engine throttles and synchronizing the engine speeds at any setting can be accomplished by handling only the one master throttle lever.

BRIEF DESCRIPTION OF THE DRAWINGS

Although the characteristic features of the present invention are particularly pointed out in the appended claims, the invention itself will be better understood by refernce to the following detailed description taken in connection with the accompanying drawings, wherein:

DETAILED DESCRIPTION OF THE INVENTION

Figure 1:
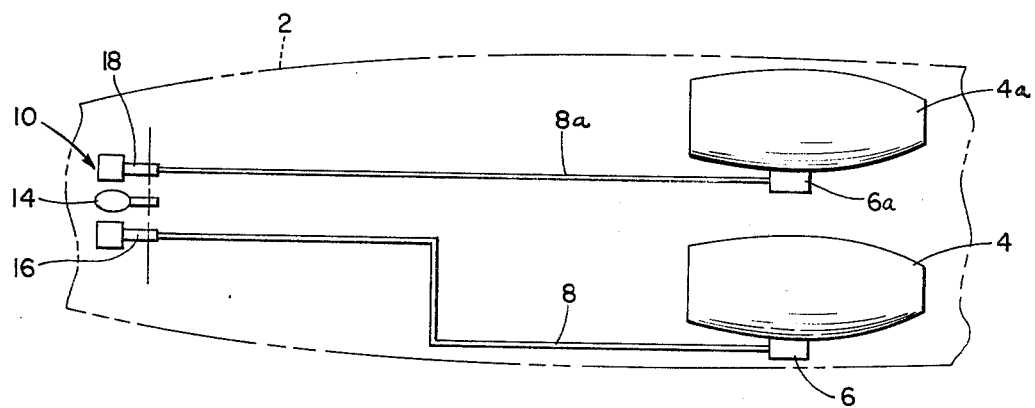
FIG. 1 is a plan view diagrammatically showing the throttle control system of this invention in a twin-engine aircraft.

Referring now to the drawings for a description of preferred embodiments of the present invention, FIG. 1 shows in phantom lines a portion of an aircraft 2 containing two engines 4 and 4a having respective throttle mechanisms 6 and 6a connected by respective conventional mechanical linkages 8 and 8a to a pilot's throttle lever assembly 10 of this invention.

Figure 2:
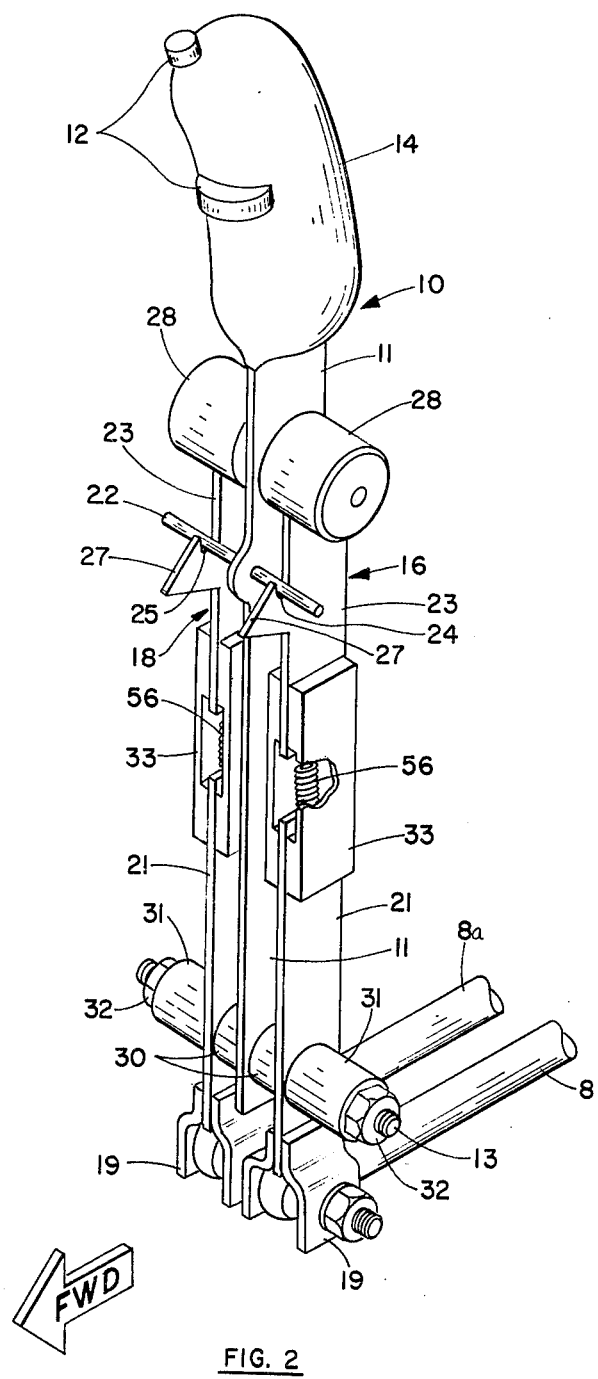
FIG. 2 is a perspective view of a pilot's throttle lever assembly incorporating the construction as herein described.

In FIG. 2 we have illustrated the throttle lever assembly 10 as comprising an elongated master throttle lever 11, a lower end of the master throttle 11 being pivotally mounted on a transverse shaft 13, the upper end of the master throttle lever 11 terminating in a handgrip 14. The handgrip 14, as illustrated, includes manual controls 12 for actuation of accessories (not shown) that may be necessary for the proper performance of the aircraft. However, the accessories are not an integral part of the present invention and are therefore not discussed further in this specification.

Pivotally mounted on the shaft 13 and adjacent to one side of the master lever 11 is a first slave throttle lever assembly 16 which is employed for speed control of the first engine 4. Also pivotally mounted on the shaft 13 but located on the other side of the master lever 11 is a second slave throttle lever assembly 18 which is used for speed control of the second engine 4a.

The first slave lever assembly 16 and the second slave lever assembly 18 are held in a spaced relationship to the master lever 11 by lever spacers 30 which fit freely over the shaft 13. Outer spacers 31 are provided to establish a proper mating relationship to the aircraft structure (as can best be seen in FIG. 4). Each end of the shaft 13 is threaded and nuts 32 hold the throttle lever assembly 10 together for installation into an aircraft.

Both the first slave lever assembly 16 and the second slave lever assembly 18 are comprised of three sections. The three sections are, a detent section 23 whose upper end terminates with a knob 28 and whose lower end is slidably held, a second section which is identified as a spring mechanism 33 (described in the detailed description of FIG. 5), and a linkage section 21 whose upper end is fixed to the spring mechanism 33 and whose lower end terminates with a linkage connector end 19.

The first slave lever assembly 16 and the second slave lever assembly 18 control their respective engine throttles through linkages 8 and 8a which are connected to the linkage connector ends 19 of the throttle levers 16 and 18. The first slave lever assembly 16 is selectively held in engagement with the master lever 11 by a carriage pin 22 which is fixed to and extends laterally from each side of the master lever 11 and parallel to the shaft 13, the carriage pin 22 fitting snugly into a locking detent 24 located in the detent section 23 of the first slave lever assembly 16 and assuring unison of movement with the master lever 11 when engagement is effected. The second slave lever assembly 18 is selectively held in an adjustable synchronization range by the carriage pin 22 which engages an elongated detent 25 located in the detent section 23 of the second slave lever assembly 18.

Each detent section 23 has a pawl portion provided with a ramp 27 which provides for automatic engagement of the slave levers to the master lever 11, the method of accomplishing this function being described later in the specification.

Figure 3:
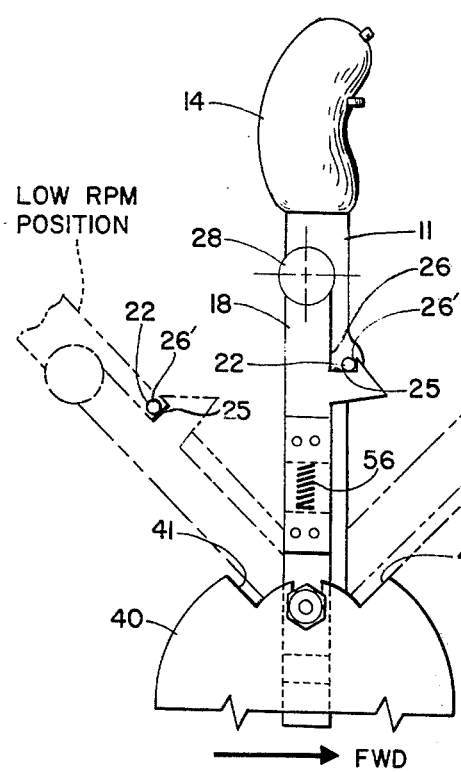
FIG. 3 is a right side elevation view of the throttle lever assembly showing details of the synchronizing detent and a throttle mechanical stop.

Referring now to FIG. 3, the carriage pin 22 of master lever 11 provides a mechanism to position the second slave lever assembly 18 at any limited desired speed setting by operating on an end surface 26 or 26' of the elongated detent 25 located in the second slave lever assembly 18. It is the elongation of the detent 25 that provides the means for synchronization of the engines by the master lever 11. For example say that both slave lever assemblies 16 and 18 are in engagement with the master lever 11 and both engines are in synchronization at a low rpm position (as shown in phantom in FIG. 3) and that the carriage pin 22 is resting in the approximate center of the elongated detent 25, which is normally the case when the engines are properly synchronized. It should be noted that the inherent friction in the present-day aircraft systems is often adequate to hold the slave lever assemblies 16 and 18 at any relative position and to assure that individual adjustment of one slave lever will not affect the other. However, state-of-the-art friction discs, brake elements, or the like can be added to increase the friction holding the slave levers in their respective positions without departing from the intent of the present invention.

When it is desired to increase the speed of the engines, the pilot pushes forward on the handgrip 14. This action moves the first slave lever assembly 16 in unison with the master lever 11. However, there is a delay in the movement of the second slave lever assembly 18 since the friction in the system will hold the second slave lever in its preset position until the carriage pin 22 contacts the forward end surface 26' of the elongated detent 25 (as shown in FIG. 3, center position). This delay will cause the second engine 4a to run slightly slower than the first engine 4. When the speed desired is achieved on the second engine 4a the forward movement of the handgrip 14 is discontinued. The handgrip 14 is then moved aft to a point where the engines are again synchronized. To decrease the speed of the engines from a high rpm position (shown in phantom in FIG. 3) and to again synchronize them at a lower speed, the handgrip 14 is moved aft. This action moves the first slave lever assembly 16 in unison with master lever 11 and immediately starts reducing the speed of the first engine 4. There is a delay in the movement of the second slave lever 18 until pin 22 contacts near surface 26 of detent 25, this delay causing the second engine 4a to run at a slightly higher speed than the other engine. When the speed desired for the second engine 4a is achieved the handgrip 14 is moved slightly forward thereby increasing the speed of the first engine 4 until the engines are again synchronized, this method of control assures the engines of the aircraft are continuously synchronized, at any desired rpm, during the operation of the aircraft.

Figure 4:
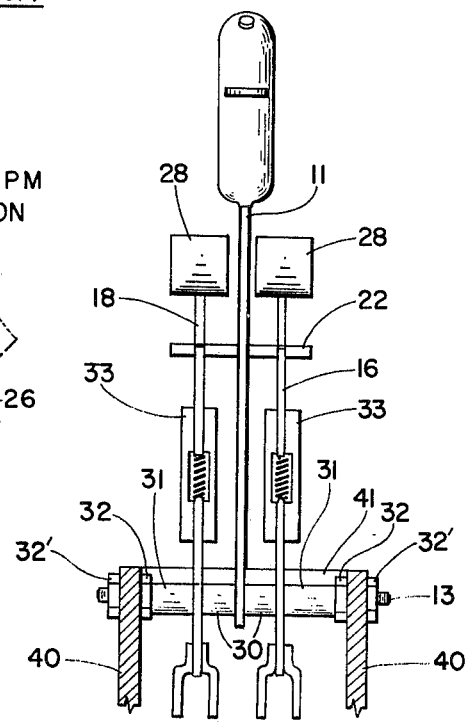
FIG. 4 is a front elevation view of the throttle lever assembly, as viewed from the front of the aircraft, showing the mounting of the assembly in the airplane.

In FIG. 4 we have illustrated the throttle lever assembly 10 installed in a section of aircraft structure 40, by additional nuts 32'. The shape of the structure 40 is not important to the function of the present invention other than to provide a holding means for the lever assembly 10 and to provide mechanical stops 41 and 42 (best seen in FIG. 3) employed to limit the travel of the master lever 11 and the slave lever assemblies 16 and 18. Also illustrated in FIG. 4 is the spring mechanism 33 which provides the means whereby the slave lever assemblies 16 and 18 can be selectively engaged and disengaged from the carriage pin 22 of the master lever 11. Details of the spring mechanism 33, which is identical for each slave lever assembly 16 and 18, are presented in FIG. 5.

It is understood that the spring mechanism 33 represents only one of many types of spring return mechanisms known in the art of mechanical design, and is shown and described in detail to illustrate the application of the principle to the present invention. It is further understood that other types of spring return mechanisms can be embodied without departing from the intent of the present invention.

Figure 5:
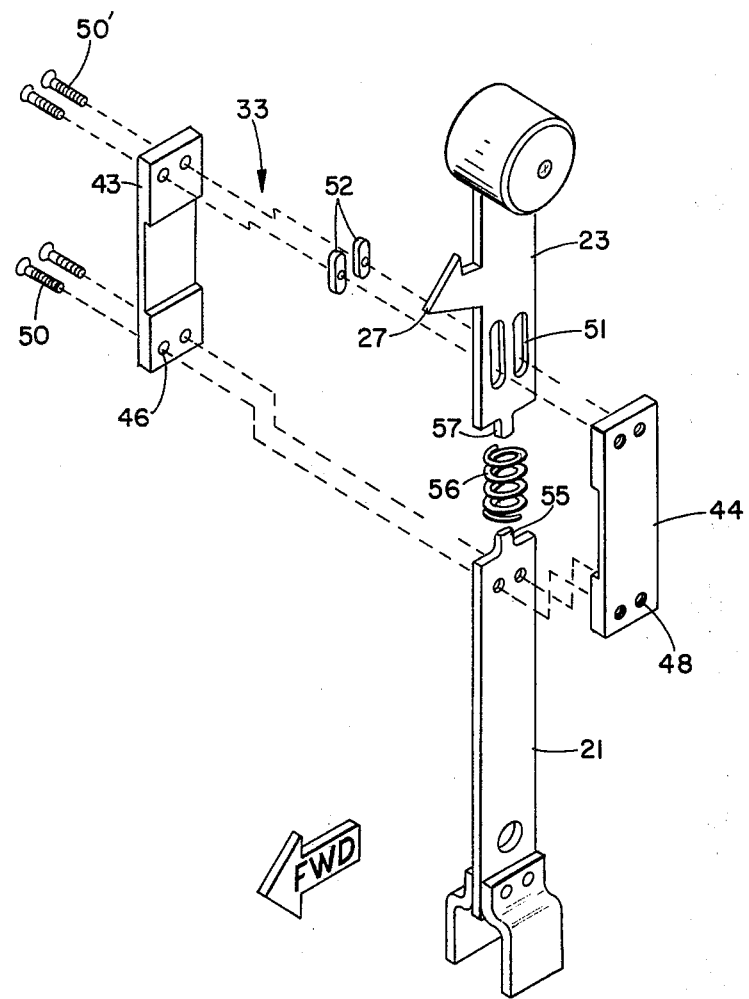
FIG. 5 is a fragmentary exploded perspective view of one slave throttle lever assembly illustrating the spring mechanism that allows for the engagement and disengagement of the slave lever to the master lever.

In FIG. 5 we present an exploded view of the spring mechanism 33 which comprises a first retainer plate 43 provided with four clearance holes 46 and a second retainer plate 44 provided with four threaded holes 48 which are in line with the clearance holes 46 when the spring mechanism 33 is held in an assembled condition by means of lower and upper screws 50 and 50'. The lower end of the detent section 23 is provided with two elongated slots 51 in which two generally rectangular guides 52 are slidably held. The lateral thickness of the guides 52 is slightly greater than the narrow thickness of the detent section 23 and thereby provides a clearance for the detent section 23 to slide freely in an up and down direction relative to guides 52 and plates 43, 44 after the spring mechanism 33 is assembled. The upper end of the linkage section 21 is held in a fixed relationship with the first retainer plate 43 and the second retainer plate 44 by lower screws 50.

Located on the upper end of the linkage section 21 is a first spring boss 55 and located on the lower end of the detent section 23 is a second spring boss 57. A compression spring 56 is held captive by the first spring boss 55 and the second spring boss 56 and maintains an upward force acting on the detent section 23.

Figure 6:
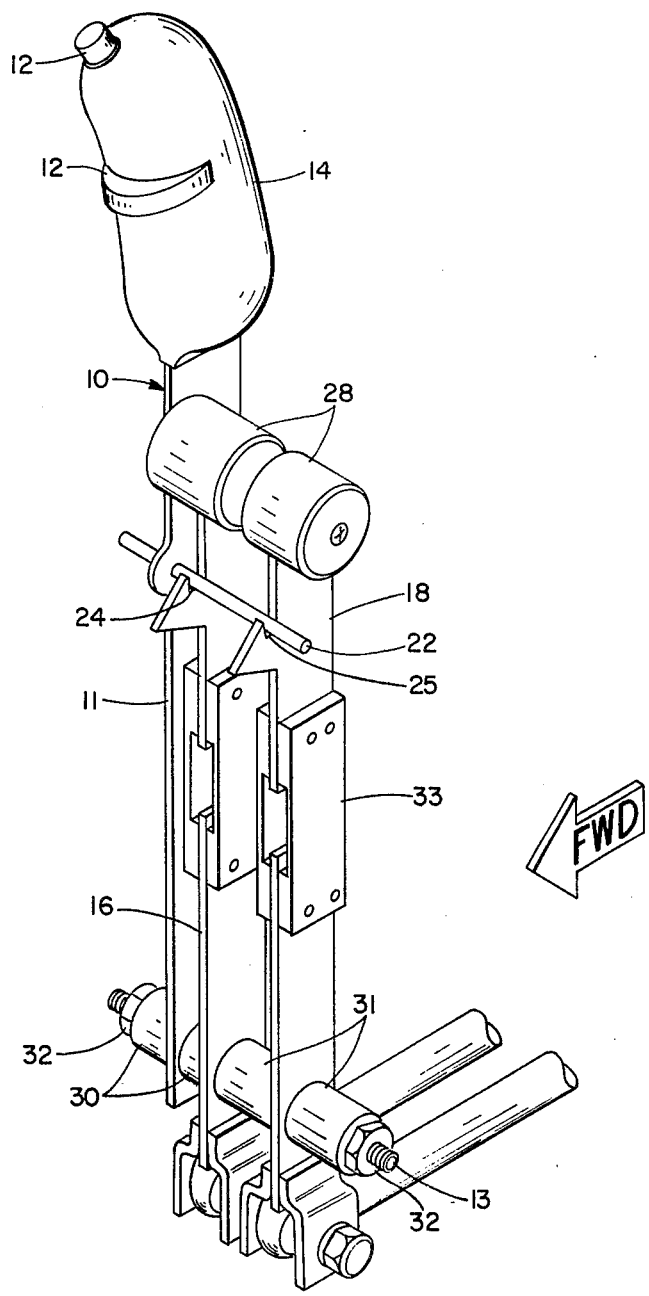
FIG. 6 is a perspective view of another embodiment of the present invention showing both slave throttle levers on one side of the master throttle lever.

In FIG. 6 we have illustrated the throttle lever assembly 10 rearranged so that both slave lever assemblies 16 and 18 are on the same side of the master lever 11, with slave lever assembly 18 being in the outermost position. It can be seen by referring to FIGS. 6 and 7, that any desired configuration or order of throttle levers can be achieved, to conform to the particular requirements of an aircraft, without departing from the intent and scope of the present invention.

Figure 7:
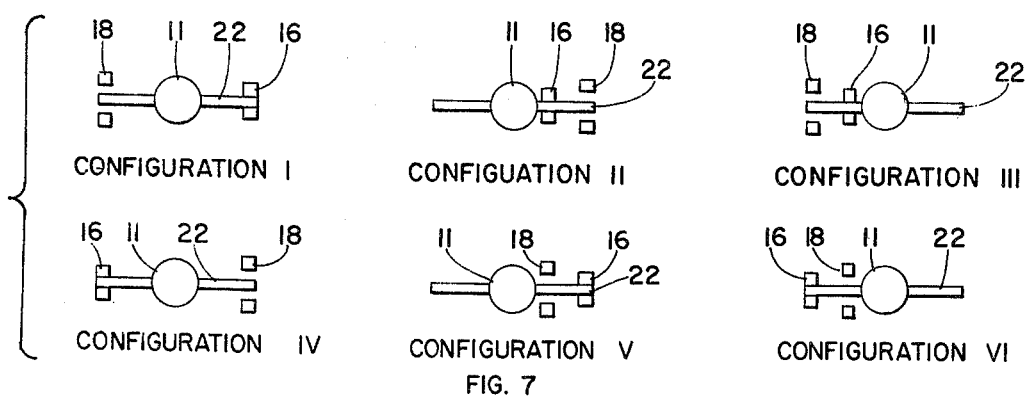
FIG. 7 is a top diagrammatic view of six configurations of the present invention.

In FIG. 7 we have presented a top diagrammatic view of six configurations in which the present invention can be assembled and used to meet the particular needs of an aircraft.

Configuration I displays the configuration represented in FIG. 2 in which the first slave throttle lever 16 is shown on the left side (aircraft coordinates) of master throttle lever 11 and the second slave throttle lever 18 is shown on the right side of master throttle lever 11.

Configuration II displays the configuration represented in FIG. 6 in which both slave levers 16 and 18 are on the left side (aircraft coordinates) of the master lever 11 with slave lever 18 being in the extreme lefthand position.

Configuration III displays both slave levers 16 and 18 as being on the right-hand side (aircraft coordinates) of master lever 11 with slave lever 18 being in the extreme right-hand position.

Configuration IV displays the first slave lever 16 on the right side (aircraft coordinates) of the master lever 11 and the second slave lever 18 on the left side of master lever 11.

Configuration V displays both slave levers 16 and 18 on the left side of master lever 11 with slave lever 16 being in the extreme lefthand position.

Configuration VI displays both slave levers 16 and 18 on the right-hand side of master lever 11 with slave lever 16 being in the extreme right-hand position.

MODE OF OPERATION OF THE INVENTION

During ground operation of a twin-engine aircraft it is often desirable to use only one engine. Using the present invention, the pilot may disengage the throttle lever of either engine by exerting a downward force to knob 28 of the desired slave lever. This action compresses spring 56 and urges pin 22 out of its detent (detent 24 in the case of disengagement of slave lever 16 and detent 25 in the case of disengagement of slave lever 18). The selected slave lever is then moved aft to the extreme low-speed position, leaving the remaining slave lever to be operated by the movement of the master lever 11. When it is desirable to reengage the disengaged slave lever, the pilot may pull the master lever 11 aft, forcing pin 22 to ride up the ramp 27 (seen best in FIG. 2) of the disengaged slave lever, compressing its spring 56 and urging pin 22 into the detent of the disengaged slave lever and thereby automatically engaging the slave lever with the master lever 11. Using this method the pilot need not remove his hand from the master throttle lever 11 to engage a disengaged slave lever. Another method of engaging a slave throttle lever is for the pilot to exert a downward force on the knob 28 of the disengaged slave lever (16 or 18), compressing its spring 56 and then while holding the downward force bringing the slave lever forward until its detent (24 or 25) is in line with the pin 22 of master lever 11. When the detent is in line with pin 22 the pilot releases the knob 28 and spring 56 pushes the detent into engagement with the pin 22. Spring 56 then maintains the engagement of the slave lever to the master lever by its spring force. The method of engine synchronization using the present invention was presented in the detailed description of FIG. 3 and therefore is not repeated here.

It will be noted that many mechanical modifications can be made to the apparatus shown herein while still remaining equivalent in nature and concept. For instance, in addition to the six relative position possibilities pointed our for the throttle levers, the fore-and-aft directions as shown in the drawings may be reversed, or the shaft 13 mounting may be placed above the handles if desired, as well as selecting any desired or required shaft alignment direction in the aircraft. Or, the shaft 13 can actually be omitted in favor of a strictly linear motion of the control levers. The same concept could also be incorporated in aircraft having multiple engines, or in ships or other vehicles.

While in order to comply with the statute, the invention has been described in language more or less specific as to structural features, it is to be understood that the invention is not limited to the specific features shown, and the invention is claimed in any of its forms or modifications within the legitimate and valid scope of the appended claims.

What is claimed is:

1. In an aircraft having two engines, a pilot's throttle lever assembly for speed control and continuous synchronization of said engines throughout their operational range, said lever assembly comprising:
   a. an elongated master throttle lever pivotally mounted on a transverse shaft, said master lever having a fixed pin extending laterally therefrom in a parallel direction with said transverse shaft;
   b. a first slave throttle lever pivotally mounted on said transverse shaft, linkage connecting means on said first slave lever for connection to a first engine throttle operation linkage, said first slave lever having means defining a locking detent adapted to releasably engage said fixed pin of said master lever to assure unison of movement between said master lever and said first slave lever when said fixed pin is releasably held in engagement with said locking detent by an elastic means; and c. a second slave throttle lever pivotally mounted on said transverse shaft, other linkage connecting means on said second slave lever for connection to a second engine throttle operating linkage, said second slave lever having means defining an elongated detent adapted to releasably engage said fixed pin of said master lever to provide for limited movement of said master lever relative to said second slave lever when said fixed pin is releasably held in engagement with said elongated detent by an elastic means and thereby providing means readily allowing for continuous synchronization of said engines by movement of said master throttle lever.

2. A throttle lever assembly of the type set forth in claim 1 in which:
   a. said first slave throttle lever is disposed to the left side of said master throttle lever; and
   b. said second slave throttle lever is disposed to the right side of said master lever.

3. A throttle lever assembly of the type set forth in claim 1 in which:
   a. said first slave throttle lever and said second slave throttle lever are disposed to the left side of said master throttle lever; and
   b. said first slave lever is disposed between said master lever and said second slave lever.

4. A throttle lever assembly of the type set forth in claim 1 in which:
   a. said first slave throttle lever and said second slave throttle lever are disposed to the right side of said master throttle lever; and
   b. said first slave lever is disposed between said master lever and said second slave lever.

5. A throttle lever assembly of the type set forth in claim 1 in which:
   a. said first slave throttle lever is disposed to the right side of said master throttle lever; and
   b. said second slave lever is disposed to the left side of said master lever.

6. A throttle lever assembly of the type set forth in claim 1 in which:
   a. said first slave throttle lever and said second slave throttle lever are disposed to the left side of said master throttle lever; and
   b. said second slave lever is disposed between said master lever and said first slave lever.

7. A throttle lever assembly of the type set forth in claim 1 in which:
   a. said first slave throttle lever and said second slave throttle lever are disposed to the right side of said master throttle lever; and
   b. said second slave lever is disposed between said master lever and said first slave lever.

8. In an aircraft having two engines, a throttle lever assembly for selectively operating one or both engines and synchronizing the engines by manual use of a single master throttle lever which selectively engages two slave throttle levers, said lever assembly comprising:
   a. a pivotally mounted master throttle lever having a carriage pin extending therefrom;
   b. a pivotally mounted first engine slave throttle lever having means defining a locking detent and spring means to releasably engage said carriage pin of said master lever into said locking detent, said spring means exerting an upward force on said locking detent when said locking detent is in engagement with said carriage pin; and
   c. a pivotally mounted second engine slave throttle lever having means defining an elongated detent adapted to releasably engage said carriage pin of said master lever for limited free pivotal movement of said second lever relative to said master lever, said second slave lever being provided with spring means to releasably engage said carriage pin into said elongated detent, said spring means exerting a upward force on said elongated detent when said elongated detent is in engagement with said carriage pin.

9. In a vehicle having at least two engines; a pilot's throttle lever assembly for accomplishing easy speed synchronization of said two engines, comprising:
   a. a master throttle lever;
   b. a first and a second slave throttle lever;
   c. shaft means connected in said aircraft for rotatably mounting said levers in adjacent positions thereon;
   d. a handle member on each of said levers;
   e. means for connecting a first engine throttle operating linkage means to said first slave lever and separate means for connecting a second engine throttle operating linkage means to said second slave lever;
   f. a pin-like member fixed to said master lever and extending to each of said slave levers;
   g. a pawl type member movably mounted on each of said slave levers and having a ramp surface and a detent adjacent said ramp;
   h. elastic means on each of said slave levers for urging said pawls, respectively, to a position where said pin member on said master lever is engagable in said detent;
   i. said ramp surfaces being respectively located in the path of said pin member so that said pin member can ride over said ramp displacing said pawl member against the urging of said elastic means for automatic engagement of said pin member in said detent;
   j. said handles on each of said slave levers being drivingly connected to said elastic means for manually disengaging said detents, respectively, from said pin member, whereby either slave lever can be operated independently of the other slave lever;
   k. the detent of said pawl member on said first slave lever being sized to lock said master lever to said first slave lever for integral movement when engaged; and
   l. the detent of said pawl member on said second slave lever being elongated to allow a predetermined amount of relative motion between said master lever and said second slave lever when engaged.

10. In an aircraft having two engines, a throttle lever assembly for selectively operating one or both engines and synchronizing the engines by manual use of a single master throttle lever which selectively engages two slave throttle levers, said lever assembly comprising:
   a. a pivotally mounted master throttle lever having a carriage pin extending therefrom;
   b. a pivotally mounted first engine slave throttle lever having means defining a locking detent, said locking detent includes a ramp which provides means for automatically engaging said first slave throttle to said master lever when said carriage pin rides over said ramp and spring means to releasably engage said carriage pin of said master lever into said locking detent; and c. a pivotally mounted second engine slave throttle lever having means defining an elongated detent, said elongated detent include a ramp which provides means for automatically engaging said second throttle lever to said master lever when said carriage pin rides over said ramp and adapted to provide for limited free pivotal movement of said second slave lever relative to said master lever, said second slave lever being provided with spring means to releasably engage said carriage pin into said elongated detent.

11. The lever assembly of the type set forth in claim 9 in which said master lever and both said first and said second slave levers are pivotally mounted on a common shaft.

* * * * *